(12) United States Patent
Kitamura et al.

(10) Patent No.: US 12,304,030 B2
(45) Date of Patent: May 20, 2025

(54) METHOD OF MANUFACTURING GROUND PRODUCT AND CUP GRINDING STONE

(71) Applicant: NGK INSULATORS, LTD., Nagoya (JP)

(72) Inventors: Kazumasa Kitamura, Ichinomiya (JP); Hirofumi Hosokawa, Nagoya (JP); Nobuchika Noguchi, Ichinomiya (JP)

(73) Assignee: NGK INSULATORS, LTD., Nagoya (JP)

( * ) Notice: Subject to any disclaimer, the term of this patent is extended or adjusted under 35 U.S.C. 154(b) by 1667 days.

(21) Appl. No.: 16/254,916

(22) Filed: Jan. 23, 2019

(65) Prior Publication Data

US 2019/0152021 A1    May 23, 2019

Related U.S. Application Data

(63) Continuation of application No. PCT/JP2017/026495, filed on Jul. 21, 2017.

(30) Foreign Application Priority Data

Aug. 10, 2016 (JP) .................................. 2016-157439

(51) Int. Cl.
*B24B 5/01* (2006.01)
*B01D 39/00* (2006.01)
(Continued)

(52) U.S. Cl.
CPC .............. *B24D 7/18* (2013.01); *B01D 39/00* (2013.01); *B01D 46/00* (2013.01); *B01J 35/56* (2024.01);
(Continued)

(58) Field of Classification Search
CPC .... B24B 5/01; B24B 5/02; B24B 5/04; B24B 5/045; B24D 7/00; B24D 7/02;
(Continued)

(56) References Cited

U.S. PATENT DOCUMENTS 3,816,997 A * 6/1974 Rupp ..................... B24D 7/14
451/277
5,063,714 A * 11/1991 Meyer ..................... B24D 7/14
451/544
(Continued)

FOREIGN PATENT DOCUMENTS

CH    174402 A    1/1935
CH    177402 A    1/1935
(Continued)

OTHER PUBLICATIONS

International Search Report and Written Opinion (Application No. PCT/JP2017/026495) dated Aug. 29, 2017.

(Continued)

*Primary Examiner* — Eileen P Morgan
(74) *Attorney, Agent, or Firm* — BURR PATENT LAW, PLLC

(57) ABSTRACT

Through the following steps (a) and (b), the side surface of a grinding object is ground to manufacture a ground product having a smaller diameter than that of the grinding object. In the step (a), a cup type grinding stone is disposed such that the central axis is parallel offset from a state where the central axis is orthogonal to the central axis of the grinding object. In the step (b), the cup type grinding stone is axially rotated so that the cup type grinding stone grinds the side surface of the grinding object while the grinding object is axially rotated and moved in the axial direction. Thereby, the outer peripheral surface of the grinding object is finish-ground by the bottom grinding stone portion of the cup type grinding stone while the grinding object is rough-ground by the side grinding stone portion to obtain a ground product.

4 Claims, 8 Drawing Sheets

(51) Int. Cl.
  B01D 46/00 (2022.01)
  B01J 35/56 (2024.01)
  B24B 1/00 (2006.01)
  B24B 5/04 (2006.01)
  B24D 5/14 (2006.01)
  B24D 7/00 (2006.01)
  B24D 7/14 (2006.01)
  B24D 7/18 (2006.01)
  C04B 38/00 (2006.01)
(52) U.S. Cl.
  CPC .................. *B24B 1/00* (2013.01); *B24B 5/04* (2013.01); *B24B 5/045* (2013.01); *B24D 7/00* (2013.01); *C04B 38/00* (2013.01)
(58) Field of Classification Search
  CPC ... B24D 7/14; B24D 7/18; B24D 5/00; B24D 5/02; B24D 5/14
  USPC ............ 451/49, 65, 178, 242, 246, 254, 259
  See application file for complete search history.

(56) References Cited

U.S. PATENT DOCUMENTS

| | | | | |
|---|---|---|---|---|
| 2004/0198206 | A1* | 10/2004 | Toge | B24B 53/12 451/547 |
| 2006/0009134 | A1* | 1/2006 | Katayama | B24D 7/18 451/41 |
| 2006/0289501 | A1 | 12/2006 | Michiwaki et al. | |
| 2011/0165823 | A1* | 7/2011 | Ide | B24B 37/00 451/340 |
| 2015/0052757 | A1 | 2/2015 | Okazaki | |
| 2016/0263728 | A1* | 9/2016 | Umetsu | B28B 11/12 |

FOREIGN PATENT DOCUMENTS

| | | | | |
|---|---|---|---|---|
| DE | 38 11 584 | A1 | 10/1989 | |
| EP | 3045267 | * | 7/2016 | |
| JP | S61-168472 | A1 | 7/1986 | |
| JP | S62-193756 | A1 | 8/1987 | |
| JP | H06-031954 | U | 4/1994 | |
| JP | H06-335849 | A1 | 12/1994 | |
| JP | 2001-191240 | A1 | 7/2001 | |
| JP | 2006-281039 | A1 | 10/2006 | |
| JP | 2006-320806 | A1 | 11/2006 | |
| JP | 4632125 | B2 * | 2/2011 | B24B 19/22 |

OTHER PUBLICATIONS

Japanese Office Action (Application No. 2018-532912) dated Sep. 17, 2019 (with English translation).
English translation of International Preliminary Report on Patentability (Chapter I) (Application No. PCT/JP2017/026495) dated Feb. 21, 2019, 13 pages.
German Office Action (with English translation) dated Feb. 26, 2025 (Application No. 11 2017 003 981.9).

* cited by examiner

METHOD OF MANUFACTURING GROUND PRODUCT AND CUP GRINDING STONE

BACKGROUND OF THE INVENTION

1. Field of the Invention

The present invention relates to a method of manufacturing a ground product and a cup grinding stone.

2. Description of the Related Art

As a method of manufacturing a cylindrical body by grinding the side surface of a polygonal-pillar or cylindrical grinding object (i.e., a workpiece) to manufacture a cylindrical body having a smaller diameter than that of the grinding object, for example, a manufacturing method disclosed in PTL 1 is known. As shown in FIG. 14, PTL 1 discloses a method of manufacturing a cylindrical honeycomb structure 230 by processing the outer periphery of a polygonal-pillar honeycomb structure 220 made of porous ceramic using a wheel-shaped grinding stone 210 having a grinding stone layer on its side surface.

CITATION LIST

Patent Literature

PTL 1: JP 2006-320806 A

SUMMARY OF THE INVENTION

However, in the method of FIG. 14, since the width w of the grinding stone 210 is narrow, the speed of axial movement of the honeycomb structure 220 cannot be increased unless the speed of axial rotation of the grinding stone 210 and the speed of axial rotation of the honeycomb structure 220 are increased. Further, even if the grinding stone 210 and the honeycomb structure 220 are rotated at a high speed, there is a limit, so that it is difficult to sufficiently shorten the working time.

The present invention has been made in order to solve such problems, and it is a main object of the present invention to shorten the working time for grinding a grinding object into a ground product.

The method of manufacturing a ground product of the present invention is a method of manufacturing a ground product having a smaller diameter than that of a grinding object by grinding the side surface of the grinding object having a polygonal-pillar or cylindrical shape, and includes the steps of (a) disposing a cup type grinding stone including a side grinding stone portion provided on the side surface of a cup and a bottom grinding stone portion provided on the bottom surface of the cup such that the central axis of the cup type grinding stone is orthogonal to the central axis of the grinding object, or such that the central axis of the cup type grinding stone is parallel offset from a state where the central axis of the cup type grinding stone is orthogonal to the central axis of the grinding object, and (b) axially rotating the cup type grinding stone so that the cup type grinding stone grinds the side surface of the grinding object while axially rotating the grinding object and moving the grinding object in the axial direction, and thereby finish-grinding the outer peripheral surface of the grinding object with the bottom grinding stone portion while rough-grinding the grinding object with the side grinding stone portion to obtain the ground product.

In this manufacturing method, the outer peripheral surface of the grinding object is finish-ground by the bottom grinding stone portion while the grinding object is rough-ground by the side grinding stone portion to obtain the ground product having a smaller diameter than that of the grinding object. That is, in this manufacturing method, the grinding object is ground using both the side grinding stone portion and the bottom grinding stone portion. Therefore, the working time can be shortened as compared with the case where the grinding object is ground by using a wheel-shaped grinding stone having a grinding stone layer on its side surface as in the conventional art.

In the manufacturing method of the present invention, it is preferable that in the step (a), as the cup type grinding stone, one in which the abrasive grains of the bottom grinding stone portion are finer than those of the side grinding stone portion be used. Thus, the rough-grinding of the grinding object by the side grinding stone portion can be efficiently performed and the finish-grinding of the grinding object by the bottom grinding stone portion can be smoothly performed.

In the manufacturing method of the present invention, it is preferable that in the step (a), as the cup type grinding stone, one in which the boundary between the side grinding stone portion and the bottom grinding stone portion is rounded be used. Thus, the boundary between the surface rough-ground by the side grinding stone portion and the surface finished by the bottom grinding stone portion of the grinding object is not angular but curved, and therefore the ground product is less likely to be chipped.

In the manufacturing method of the present invention, it is preferable that in the step (a), as the cup type grinding stone, one in which the bottom grinding stone portion is annularly provided along the outer periphery of the bottom surface of the cup be used. Although the bottom grinding stone portion may be provided on the entire bottom surface of the cup, it is preferable that the bottom surface grinding stone portion be provided annularly rather than on the entire bottom surface in consideration of the ease of attaching to and detaching from the grinding device.

In the manufacturing method of the present invention, it is preferable that in the step (a), the central axis of the cup type grinding stone be parallel offset from a state where the central axis of the cup type grinding stone is orthogonal to the central axis of the grinding object, and the central axis of the cup type grinding stone be offset such that one line segment appears on the bottom grinding stone portion when the central axis of the grinding object is projected onto the bottom grinding stone portion of the cup type grinding stone, and such that the length of the line segment is Lmax/2 or more and Lmax or less (Lmax is the length of the line segment when offsetting is performed such that the line segment is a tangent to the inner periphery of the bottom grinding stone portion). Thus, the length of the line segment (part of the bottom grinding stone portion used for finish-grinding, working width) is long as compared with the case where two line segments appear on the bottom grinding stone portion when the central axis of the grinding object is projected onto the bottom grinding stone portion. Therefore, the speed at which the grinding object is moved in the axial direction can be increased, and the working time can be further shortened. In addition, since the boundary between the surface rough-ground by the side grinding stone portion and the surface finished by the bottom grinding stone portion has a more gently curve shape, chipping or the like is less likely to occur in the ground product.

In the manufacturing method of the present invention, the grinding object is not particularly limited, but is preferably a ceramic structure. Such a structure may be a fired body or a molded body (structure before firing), may be a non-solid body having a cavity therein, or may be a solid body. Examples of the non-solid body include a cylindrical body and a honeycomb structure, and a honeycomb structure is preferred. Specific examples of the honeycomb structure include a honeycomb structure in which a plurality of cells are not sealed (for example, a catalyst support), and a honeycomb structure in which cells having one ends sealed and the other ends opened and cells having one ends opened and the other ends sealed are alternately arranged (for example, a diesel particulate filter (DPF)).

The cup type grinding stone of the present invention includes a side grinding stone portion provided on the side surface of a cup, and a bottom grinding stone portion provided on the bottom surface of the cup and having an abrasive grain size finer than that of the side grinding stone portion.

This cup type grinding stone is suitable for the above-described manufacturing method, that is, the method in which the outer peripheral surface of the grinding object is finish-ground by the bottom grinding stone portion while the grinding object is rough-ground by the side grinding stone portion.

In the cup type grinding stone of the present invention, it is preferable that the boundary between the side grinding stone portion and the bottom grinding stone portion be rounded. Thus, the boundary between the surface rough-ground by the side grinding stone portion and the surface finished by the bottom grinding stone portion of the grinding object is not angular but curved, and therefore the ground product is less likely to be chipped.

In the cup type grinding stone of the present invention, it is preferable that the bottom grinding stone portion be annularly provided along the outer periphery of the bottom surface of the cup. Although the bottom grinding stone portion may be provided on the entire bottom surface of the cup, it is preferable that the bottom surface grinding stone portion be provided annularly rather than on the entire bottom surface in consideration of the ease of attaching to and detaching from the grinding device.

DETAILED DESCRIPTION OF THE INVENTION

Figure 1:
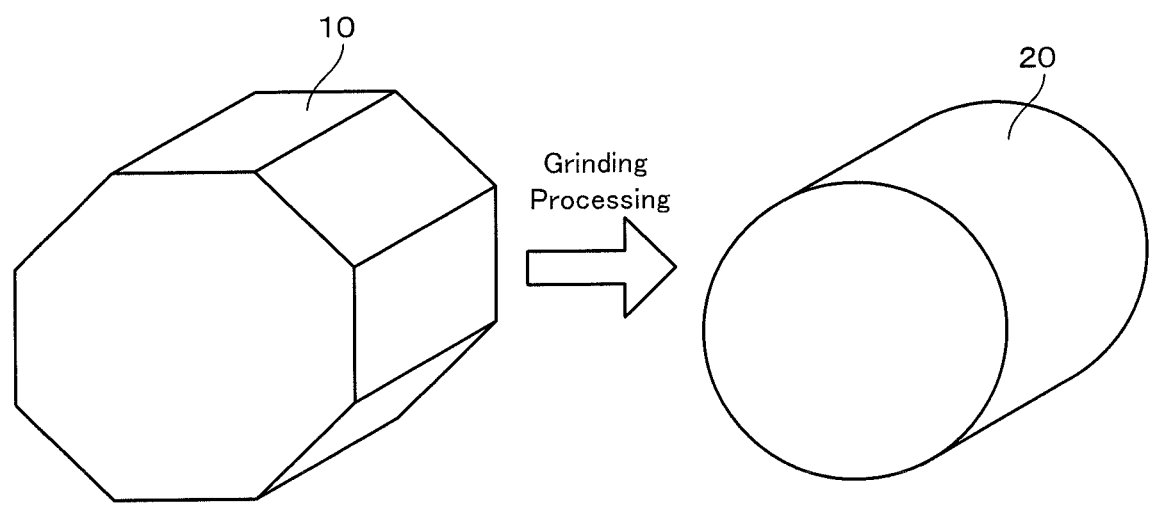
FIG. 1 is an explanatory diagram showing a process of manufacturing a ground product 20 from a grinding object 10.
Figure 2:
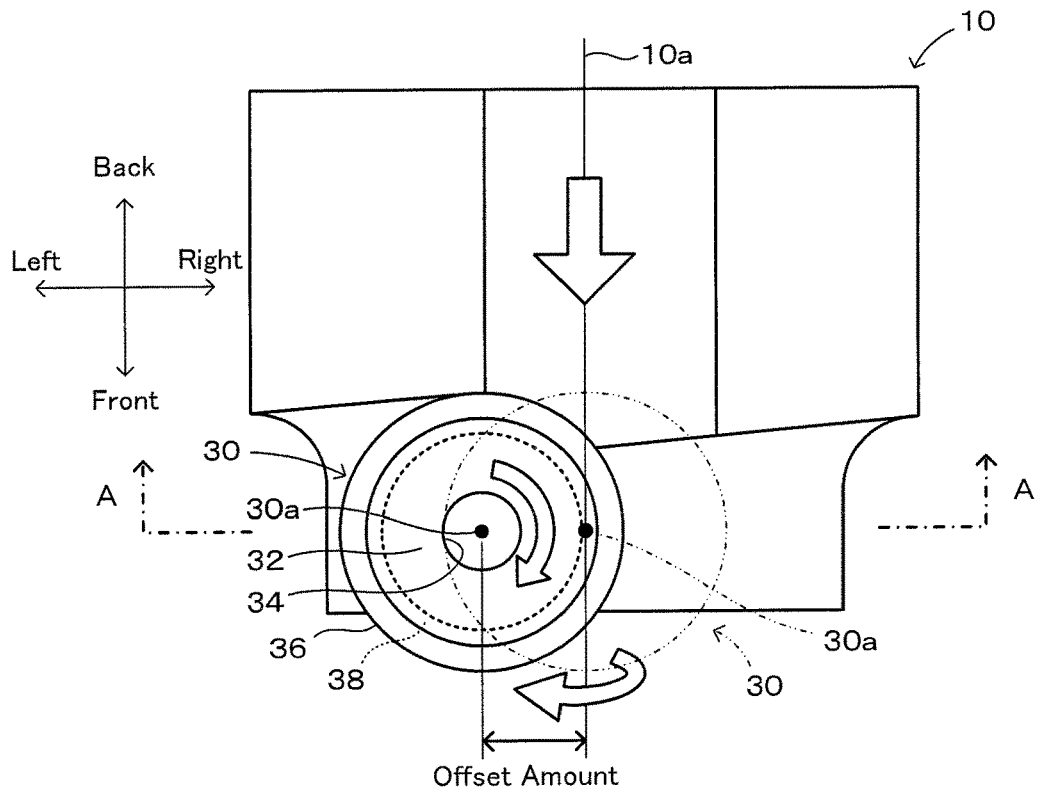
FIG. 2 is a plan view showing a state in which the grinding object 10 is ground with a cup type grinding stone 30.
Figure 3:
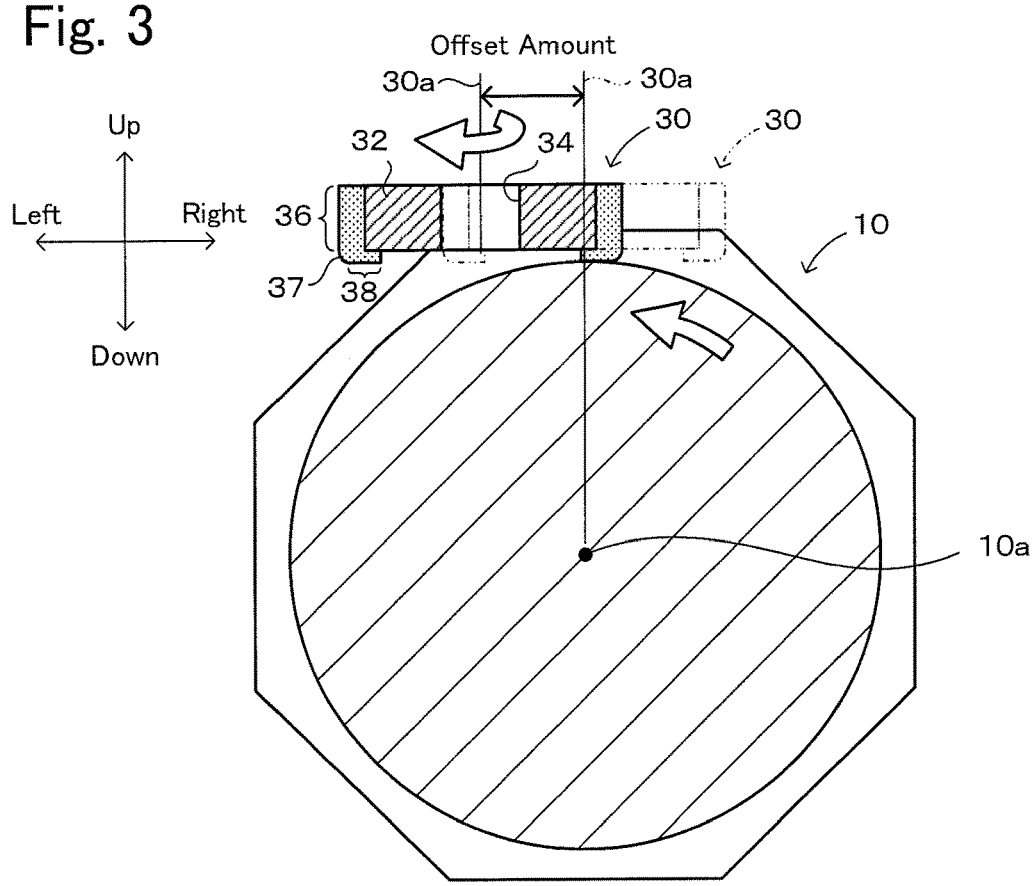
FIG. 3 is a sectional view taken along line A-A of FIG. 2.

A preferred embodiment of the present invention will now be described with reference to the drawings. FIG. 1 is an explanatory diagram showing a manufacturing process of a ground product 20, FIG. 2 is a plan view showing a state in which a grinding object 10 is ground with a cup type grinding stone 30, and FIG. 3 is a sectional view taken along line A-A of FIG. 2. In the following description, "up", "down", "left", "right", "front", and "back" may be used, and their directions are as shown in FIGS. 2 and 3.

In this embodiment, as shown in FIG. 1, a case will be described in which the side surface of a ceramic octagonal pillar grinding object 10 is ground to manufacture a cylindrical ground product 20 having a smaller diameter than that of the grinding object 10.

A cup type grinding stone 30 shown in FIGS. 2 and 3 is prepared prior to manufacturing of the ground product 20. The cup type grinding stone 30 includes a metal cup 32 having a through-hole 34 along the central axis 30a, a side grinding stone portion 36 provided on the side surface of the cup 32, and a bottom grinding stone portion 38 provided on the bottom surface of the cup 32. The boundary 37 between the side grinding stone portion 36 and the bottom grinding stone portion 38 is rounded. The radius of curvature of the boundary 37 is not particularly limited, but is, for example, 3 to 10 mm. The bottom grinding stone portion 38 is annularly provided along the outer periphery of the bottom surface of the cup 32. The side grinding stone portion 36 and the bottom grinding stone portion 38 are both diamond grinding stones, and may have the same abrasive grain size, but the abrasive grain size of the bottom grinding stone portion 38 is preferably finer than that of the side grinding stone portion 36. The abrasive grain size is not particularly limited, but for example, when the side grinding stone portion 36 and the bottom grinding stone portion 38 have the same abrasive grain size, the abrasive grain size is preferably 60/80 to 270/325, and when the abrasive grain size of the bottom grinding stone portion 38 is finer than the side grinding stone portion 36, it is preferable that the abrasive grain size of the side grinding stone portion 36 be 60/80 to 100/120, and the abrasive grain size of the bottom grinding stone portion 38 be 120/140 to 270/325. In this description, the abrasive grain size is shown based on JIS B 4130.

The cup type grinding stone 30 is rotatably attached to a grinding device (for example, a machining center) (not shown) via a through-hole 34 such that the central axis 30a is in the vertical direction. The grinding object 10 is attached to the grinding device such that the central axis 10a is horizontal in the front-back direction. The grinding object 10 is attached so as to be capable of axial rotation about the axis and movable in the axial direction. The rotational speed of the cup type grinding stone 30 and the rotational speed and the moving speed of the grinding object 10 can be adjusted.

Next, the following steps (a) and (b) are performed in this order to manufacture the ground product 20 from the grinding object 10.

Step (a)

First, the cup type grinding stone 30 is disposed such that the side surface of the grinding object 10 can be cut toward the central axis 10a. That is, the cup type grinding stone 30 is set such that the flat surface of the bottom grinding stone portion 38 of the cup type grinding stone 30 is located above the central axis 10a of the grinding object 10 by the radius of the ground product 20. At the same time, the cup type grinding stone 30 is set such that the central axis 30a of the cup type grinding stone 30 is in a predetermined positional relationship with the central axis 10a of the grinding object 10. In FIGS. 2 and 3, a state in which the cup type grinding stone 30 is disposed such that the central axis 30a of the cup type grinding stone 30 is orthogonal to the central axis 10a of the grinding object 10 (reference state) is indicated by a two-dot chain line. From this reference state, the cup type grinding stone 30 is offset such that the central axis 30a of the cup type grinding stone 30 is translated to the left by a predetermined distance. The predetermined distance (offset amount) may be appropriately set within a range where the bottom grinding stone portion 38 and the central axis 10a of the grinding object 10 intersect each other in FIG. 2.

Step (b)

After the grinding object 10 and the cup type grinding stone 30 are disposed as described above, the cup type grinding stone 30 is axially rotated so that the cup type grinding stone 30 grinds the side surface of the grinding object 10 while the grinding object 10 is axially rotated and moved forward along the axial direction. Thereby, the outer peripheral surface of the grinding object 10 is finish-ground by the bottom grinding stone portion 38 while the grinding object 10 is rough-ground by the side grinding stone portion 36 to obtain the ground product 20.

Figure 4:
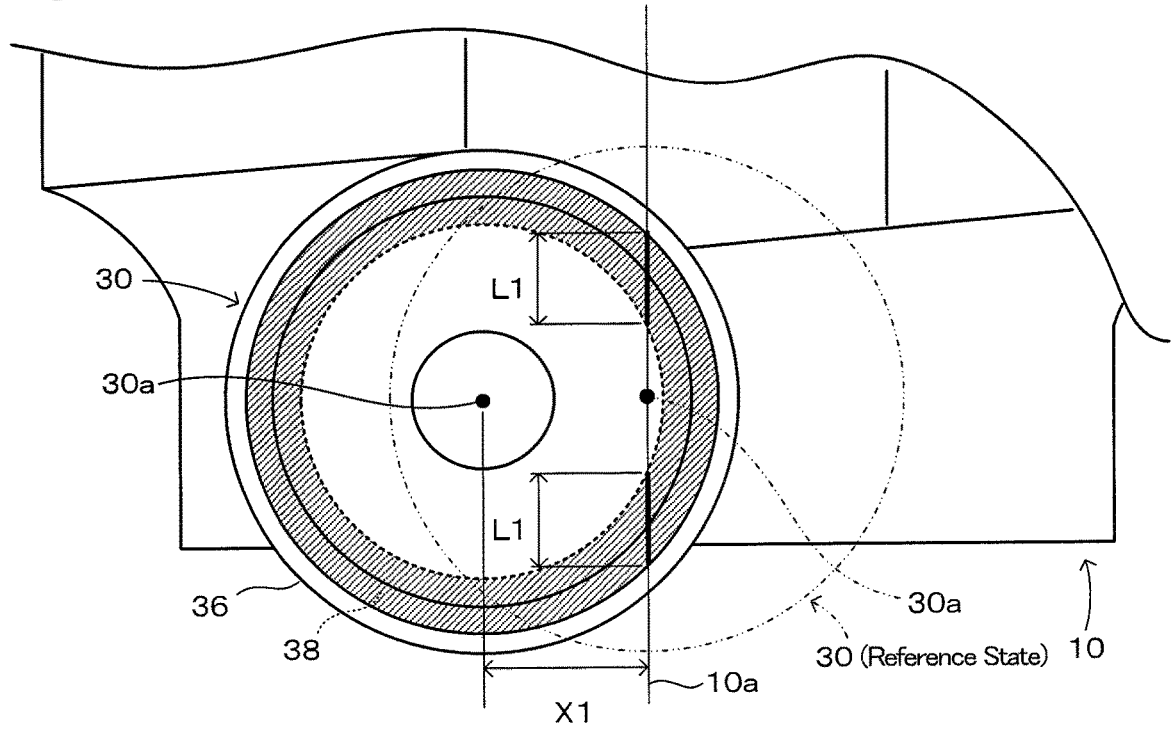
FIG. 4 is an explanatory diagram when offsetting the cup type grinding stone 30 from the reference state.
Figure 5:
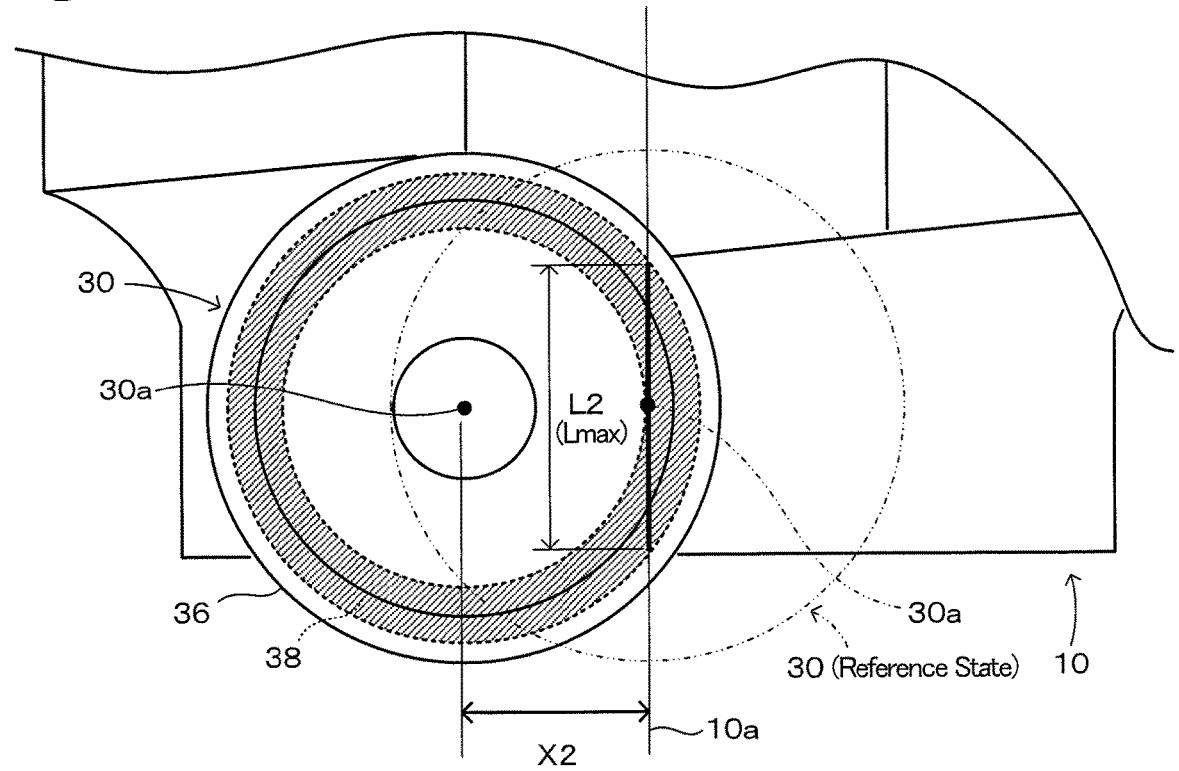
FIG. 5 is an explanatory diagram when offsetting the cup type grinding stone 30 from the reference state.

The offset amount of the cup type grinding stone 30 described in step (a) will now be described. FIGS. 4 and 5 are explanatory diagrams when offsetting the cup type grinding stone 30 from the reference state. In FIGS. 4 and 5, the bottom grinding stone portion 38 (not including the boundary 37) is hatched. FIG. 4 shows a state in which the cup type grinding stone 30 is offset such that the central axis 30a of the cup type grinding stone 30 is translated to the left by a distance X1 from the reference state (two-dot chain line). In this state, when the central axis 10a of the grinding object 10 is projected onto the bottom grinding stone portion 38 of the cup type grinding stone 30, two line segments having a length L1 (thick solid lines in FIG. 4) appear on the bottom grinding stone portion 38. On the other hand, FIG. 5 shows a state in which the cup type grinding stone 30 is offset such that the central axis 30a of the cup type grinding stone 30 is translated to the left by a distance X2 (>X1) from the reference state (two-dot chain line). In this state, when the central axis 10a of the grinding object 10 is projected onto the bottom grinding stone portion 38 of the cup type grinding stone 30, one line segment having a length L2 (thick solid line in FIG. 5) appears on the bottom grinding stone portion 38. In FIG. 5, this line segment is a tangent to the inner periphery of the bottom grinding stone portion 38.

The part of the bottom grinding stone portion 38 used for finish-grinding (working width) is a line segment having a length L1 in FIG. 4 and a line segment having a length L2 in FIG. 5. Comparing FIG. 4 with FIG. 5, since the working width is longer in FIG. 5, the speed at which the grinding object 10 is moved in the axial direction can be increased. Further, in FIG. 5, since the offset amount is larger, the boundary between the surface rough-ground by the side grinding stone portion 36 and the surface finished by the bottom grinding stone portion 38 has a more gently curved shape, so that chipping or the like is less likely to occur in the ground product 20.

By the way, the working width is the maximum length Lmax when the line segment when the central axis 10a of the grinding object 10 is projected onto the bottom grinding stone portion 38 is a tangent to the inner periphery of the bottom grinding stone portion 38 (see FIG. 5). That is, when the offset amount is X2, the working width is the maximum length Lmax. When the offset amount is less than X2, two line segments appear on the bottom grinding stone portion 38 when the central axis 10a of the grinding object 10 is projected onto the bottom grinding stone portion 38 (see FIG. 4), so that the length of the line segments is less than Lmax/2. On the other hand, as the offset amount increases beyond X2, the length of the line segment gradually decreases from Lmax. Therefore, it is preferable to set the offset amount such that one line segment appears on the bottom grinding stone portion 38 when the central axis 10a of the grinding object 10 is projected onto the bottom grinding stone portion 38, and such that the length of the line segment is Lmax/2 or more and Lmax or less.

In the above-described manufacturing method, the outer peripheral surface of the grinding object 10 is finish-ground by the bottom grinding stone portion 38 while the grinding object 10 is rough-ground by the side grinding stone portion 36 to obtain the ground product 20 having a smaller diameter than that of the grinding object 10. That is, in this manufacturing method, the grinding object 10 is ground using both the side grinding stone portion 36 and the bottom grinding stone portion 38. Therefore, the working time can be shortened as compared with the conventional method. In the configuration shown in FIG. 4 in which the offset amount is X1, as well as in the configuration shown in FIG. 5 in which the offset amount of the cup type grinding stone 30 is X2, grinding is performed using both the side grinding stone portion 36 and the bottom grinding stone portion 38, so that the working time can be shortened.

Further, since as the cup type grinding stone 30, one in which the boundary 37 between the side grinding stone portion 36 and the bottom grinding stone portion 38 is rounded is used, the boundary between the surface rough-ground by the side grinding stone portion 36 and the surface finished by the bottom grinding stone portion 38 of the grinding object 10 is not angular but curved. Therefore, the ground product 20 is less likely to be chipped.

Further, since as the cup type grinding stone 30, one in which the bottom grinding stone portion 38 is annularly provided along the outer periphery of the bottom surface of the cup 32 is used, the cup type grinding stone is easy to attach to and detach from the grinding device.

Further, when the offset amount of the cup type grinding stone 30 is set such that one line segment appears on the bottom grinding stone portion 38 when the central axis 10a of the grinding object 10 is projected onto the bottom grinding stone portion 38 and such that the length of the line segment is Lmax/2 or more and Lmax or less, the following advantageous effects can be obtained. That is, since the working width is long as compared with the case where two line segments appear on the bottom grinding stone portion 38 when the central axis 10a of the grinding object 10 is projected onto the bottom grinding stone portion 38, the speed at which the grinding object 10 is moved in the axial direction can be increased. As a result, the working time can be further shortened. In addition, since the boundary between the surface rough-ground by the side grinding stone portion 36 and the surface finished by the bottom grinding stone portion 38 has a more gently curve shape, chipping or the like is less likely to occur in the ground product 20.

Further, when the abrasive grains of the bottom grinding stone portion 38 are finer than those of the side grinding stone portion 36, the rough-grinding of the grinding object 10 by the side grinding stone portion 36 can be efficiently performed and the finish-grinding of the grinding object by the bottom grinding stone portion can be smoothly performed.

It should be noted that the present invention is not limited to the above-described embodiment at all, and it is needless to say that the present invention can be implemented in various embodiments without departing from the technical scope of the present invention.

For example, in the above-described embodiment, a honeycomb structure having a large number of cells in the axial direction may be employed as the grinding object 10. As the honeycomb structure, one in which cells having one ends sealed and the other ends opened and cells having one ends opened and the other ends sealed are alternately arranged (for example, a DPF) may be employed.

In the above embodiment, the bottom grinding stone portion 38 of the cup type grinding stone 30 is annularly provided, but the bottom grinding stone portion 38 may be provided on the entire bottom surface of the cup 32.

In the above-described embodiment, the central axis 30a of the cup type grinding stone 30 is offset to the left with respect to the central axis 10a of the grinding object 10, but may be offset to the right.

EXAMPLES

Figure 6:
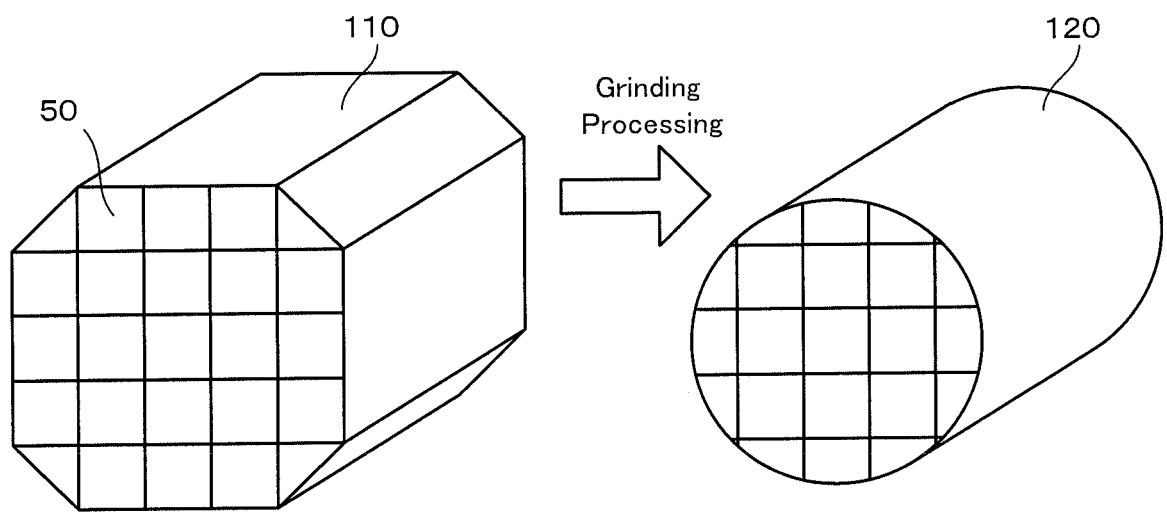
FIG. 6 is an explanatory diagram showing a process of manufacturing a DPF 120 from a honeycomb structure 110.
Figure 7:
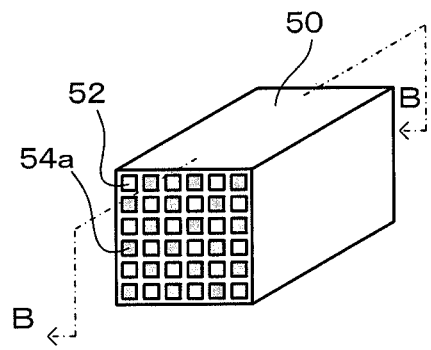
FIG. 7 is a perspective view of a honeycomb member 50.
Figure 8:
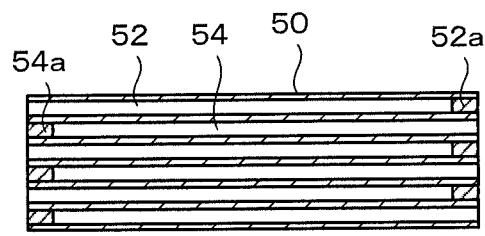
FIG. 8 is a sectional view taken along line B-B of FIG. 7.
Figure 9:
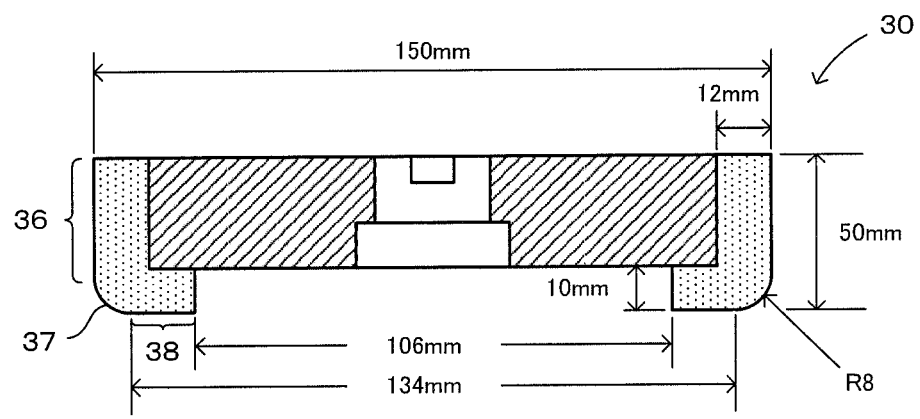
FIG. 9 shows the dimensions of a cup type grinding stone 30 used in Experimental examples 1 and 2.

Experimental examples 1 to 4, which are examples of the present invention, will be described below. FIG. 6 is an explanatory diagram showing a process of manufacturing a DPF 120 from a honeycomb structure 110, FIG. 7 is a perspective view of a honeycomb member 50, FIG. 8 is a sectional view taken along line B-B of FIG. 7, and FIG. 9 shows the dimensions of a cup type grinding stone 30 used in Experimental examples 1 and 2. The following experimental examples do not limit the present invention.

Experimental Examples 1 and 2

As a grinding object, an octagonal pillar honeycomb structure 110 made of SiC ceramic was prepared as shown in FIG. 6. The honeycomb structure 110 is formed into a wholly octagonal pillar shape by arranging cuboid honeycomb members 50 in five rows and five columns and bonding them together to form a square prism of 185 mm in height, 185 mm in width and 150 mm in depth, and then grinding the honeycomb members 50 at four corners from a cuboid shape into a triangular pillar shape. As shown in FIGS. 7 and 8, the cuboid honeycomb members 50 are each a component in which cells 52 having one ends opened and the other ends sealed with plugs 52a and cells 54 having one ends sealed with plugs 54a and the other end opened are alternately arranged.

The side surface of this grinding object 10 was ground using the cup type grinding stone 30 having the dimensions shown in FIG. 9 to manufacture a ground product 20 which was a DPF having a diameter of 165 mm. The grinding was performed by feeding the grinding object 10 forward. In both Experimental examples 1 and 2, the offset amount was set such that the working width was the maximum length Lmax as shown in FIG. 5. Table 1 shows the grinding conditions of Experimental examples 1 and 2.

TABLE 1

| Experimental Example | Grinding Object | | Grinding Stone | | |
|---|---|---|---|---|---|
| | Feed Speed (mm/min) | Rotational Speed (rpm) | Rotational Speed (rpm) | Offset Amount (mm) | Working Width (mm) |
| 1 | 300 | 4.5 | 7000 | 54 | 79.3 |
| 2 | 400 | 6.0 | 7000 | 54 | 79.3 |

Figure 14:
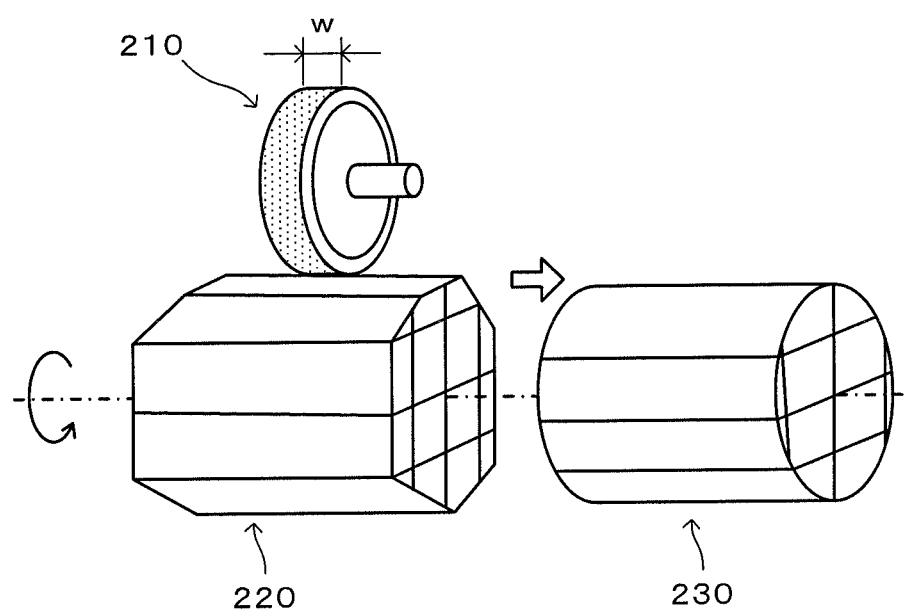
FIG. 14 is an explanatory diagram showing a conventional process of manufacturing a cylindrical honeycomb structure 230.

In both Experimental examples 1 and 2, no chipping occurred during grinding, and neither the front plugs 52a nor the back plugs 54a were damaged. The working time per piece of the grinding object 10 was 30 seconds in Experimental example 1 and 22.5 seconds in Experimental example 2. When the same grinding object 10 was ground using a wheel-shaped grinding stone 210 having a grinding stone layer on its side surface as shown in FIG. 14, the working time per piece was 40 seconds at the shortest.

Experimental Examples 3 and 4

The same grinding object 10 as in Experimental examples 1 and 2 was ground using the cup type grinding stone 30 to manufacture a ground product 20 which was a DPF having a diameter of 165 mm. As the cup type grinding stone 30, one having the dimensions shown in FIG. 9 was used except that the grinding stone height was 35 mm. The grinding was performed by feeding the grinding object 10 forward. In Experimental example 3, the offset amount was set to zero (reference state). In this case, since the working width was short, grinding was performed at a low feed speed of the grinding object 10. In Experimental example 4, the offset amount was set such that the working width was the maximum length Lmax as shown in FIG. 5. In Experimental example 4, the feed speed of the grinding object 10 can be set to a high speed as in Experimental examples 1 and 2, but in order to compare with Experimental example 3, grinding was performed under the same conditions as in Experimental example 3. Table 2 shows the grinding conditions of Experimental examples 3 and 4.

TABLE 2

| Experimental Example | Grinding Object | | Grinding Stone | | |
|---|---|---|---|---|---|
| | Feed Speed (mm/min) | Rotational Speed (rpm) | Rotational Speed (rpm) | Offset Amount (mm) | Working Width (mm) |
| 3 | 120 | 6.5 | 7000 | 0 | 14 |
| 4 | 120 | 6.5 | 7000 | 54 | 79.3 |

Figure 10:
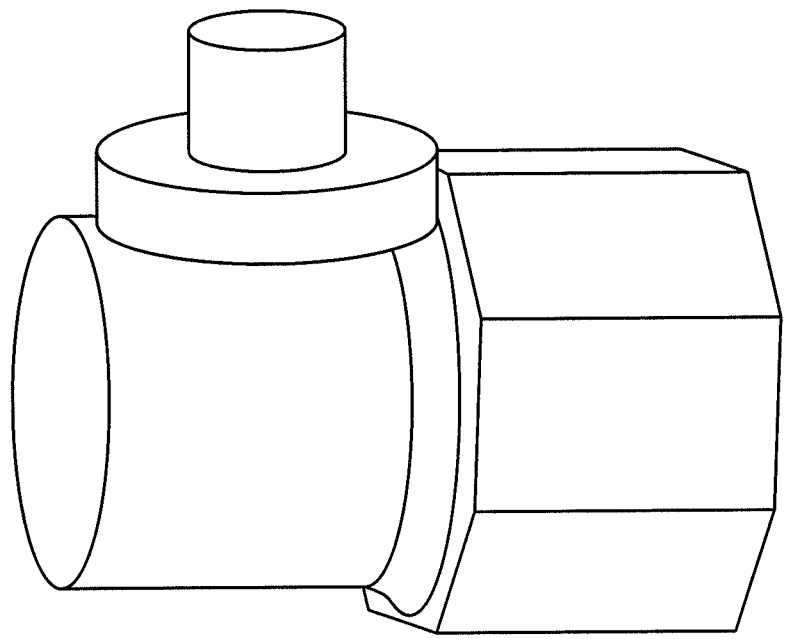
FIG. 10 is a perspective view showing a state during grinding in Experimental example 3.
Figure 11:
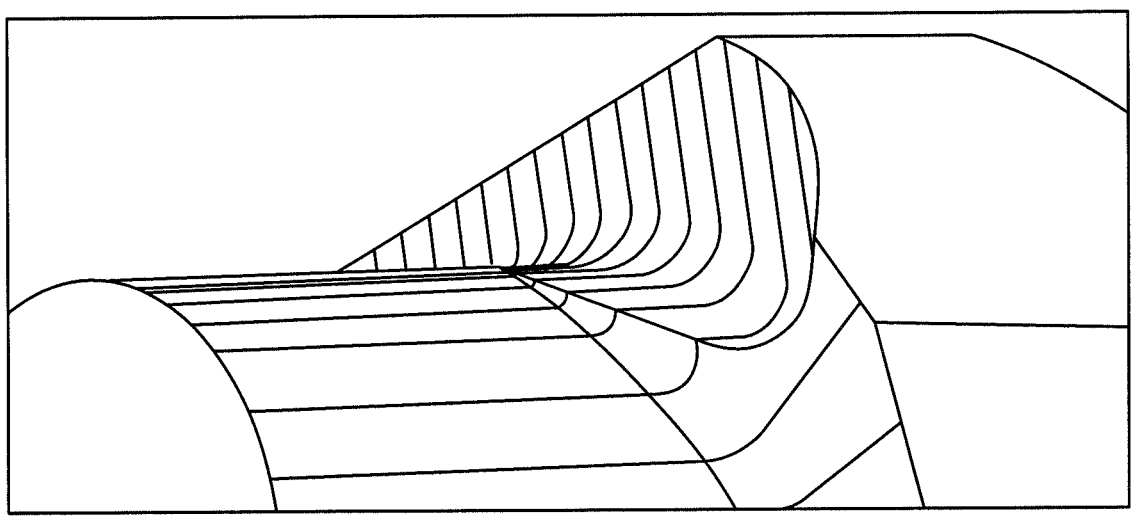
FIG. 11 is a perspective view showing the boundary between the rough-ground surface and the finished surface during grinding in Experimental example 3.
Figure 12:
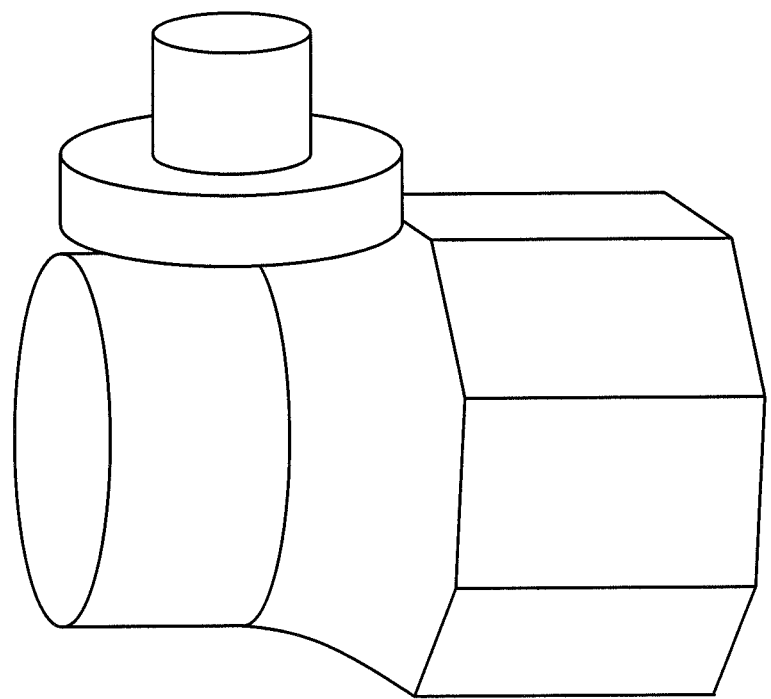
FIG. 12 is a perspective view showing a state during grinding in Experimental example 4.
Figure 13:
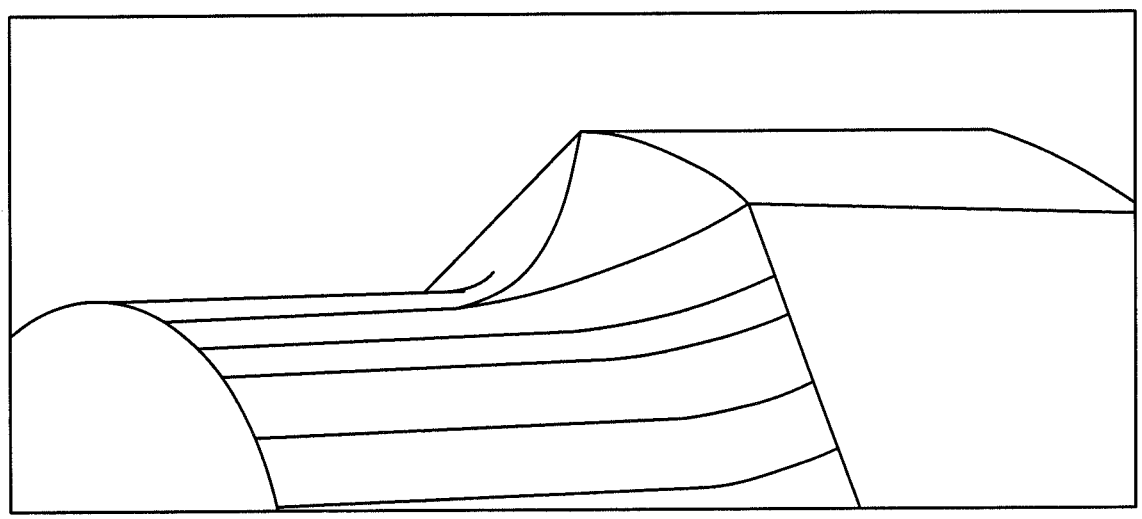
FIG. 13 is a perspective view showing the boundary between the rough-ground surface and the finished surface during grinding in Experimental example 4.

In both Experimental examples 3 and 4, no chipping occurred during grinding, and neither the front plugs 52a nor the back plugs 54a were damaged. FIG. 10 is a perspective view showing a state during grinding in Experimental example 3, and FIG. 11 is a perspective view showing a curved shape of the boundary between the rough-ground surface and the finished surface during grinding in Experimental example 3. FIG. 12 is a perspective view showing a state during grinding in Experimental example 4, and FIG. 13 is a perspective view showing a curved shape of the boundary between the rough-ground surface and the finished surface during grinding in Experimental example 4. Comparing Experimental example 3 with Experimental example 4 with reference to these figures, it can be seen that the curved surface at the boundary between the rough-ground surface and the finished surface during grinding in Experimental example 4 is a more gently curved surface (curved surface with a larger radius of curvature) than in Experimental example 3. Therefore, it can be said that when grinding is performed with the cup type grinding stone 30 offset, occurrence of chipping can be more reliably prevented and breakage of the sealing plugs can be more reliably prevented than when grinding is performed without offsetting the cup type grinding stone 30.

The present application claims priority from Japanese Patent Application No. 2016-157439, filed on Aug. 10, 2016, the entire contents of which are incorporated herein by reference.

What is claimed is:

1. A method of grinding a workpiece having an initial polygonal shape to a final cylindrical shape after grinding, the method comprising the steps of:
   (a) providing a cup grinding stone including a side grinding stone portion provided on a side surface of the cup grinding stone and a bottom grinding stone portion provided on a bottom surface of the cup grinding stone, a boundary between the side grinding stone portion and the bottom grinding stone portion is rounded, and the bottom grinding stone portion is annularly provided along an outer periphery of the bottom surface,
   (b) disposing the cup grinding stone such that a rotational central axis of the cup grinding stone is parallel and offset from a state where the central axis of the cup grinding stone is orthogonal to and intersects a central axis of the workpiece, and the central axis of the cup grinding stone is offset at an offset distance such that an imaginary line segment extends across the bottom grinding stone portion when the central axis of the workpiece is projected onto the bottom grinding stone portion of the cup grinding stone, and such that a length of the imaginary line segment is in a range from Lmax/2 to Lmax, wherein Lmax is the length of the imaginary line segment that extends across the bottom grinding stone portion when the central axis of the cup grinding stone is offset at a tangent offset distance such that the imaginary line segment forms a tangent with an inner periphery surface of the bottom grinding stone portion; and
   (c) axially rotating the cup grinding stone offset at the offset distance so that the cup grinding stone grinds an outer peripheral surface of the workpiece while the workpiece is axially rotating in a direction toward the offset direction of the offset distance of the central axis of the cup grinding stone and moving the workpiece in the axial direction of the workpiece, such that the side grinding stone portion rough-grinds the outer peripheral surface of the workpiece and the bottom grinding stone portion finish-grinds the outer peripheral surface of the workpiece to obtain the final cylindrical shape after grinding.

2. The method of grinding a workpiece according to claim 1, wherein the cup grinding stone has abrasive grains on the bottom grinding stone portion which are finer than abrasive grains on the side grinding stone portion.

3. The method of grinding a workpiece according to claim 1, wherein the grinding object is a ceramic honeycomb structure having two ends.

4. The method of grinding a workpiece according to claim 3, wherein the honeycomb structure is made of individual cells, each cell having two ends with one end sealed and one end open, such that when looking at either end of the honeycomb structure the sealed ends and open ends of the cells are alternately arranged.

* * * * *